(12) United States Patent
Zhong

(10) Patent No.: US 12,164,742 B2
(45) Date of Patent: Dec. 10, 2024

(54) DEVICE STATE IDENTIFICATION METHOD AND APPARATUS, AND INTELLIGENT TERMINAL

(71) Applicant: GUANGDONG OPPO MOBILE TELECOMMUNICATIONS CORP., LTD., Dongguan (CN)

(72) Inventor: Haohua Zhong, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/956,657

(22) Filed: Sep. 29, 2022

(65) Prior Publication Data
US 2023/0017725 A1      Jan. 19, 2023

Related U.S. Application Data

(63) Continuation of application No. PCT/CN2021/077095, filed on Feb. 20, 2021.

(30) Foreign Application Priority Data

Apr. 7, 2020 (CN) .......................... 202010263868.6

(51) Int. Cl.
*G06F 3/04817* (2022.01)
*G06F 3/0484* (2022.01)
*G06F 9/451* (2018.01)

(52) U.S. Cl.
CPC ........ *G06F 3/04817* (2013.01); *G06F 3/0484* (2013.01); *G06F 9/451* (2018.02)

(58) Field of Classification Search
CPC ..... G06F 3/04817; G06F 3/0484; G06F 9/451
See application file for complete search history.

(56) References Cited

U.S. PATENT DOCUMENTS

| | | | | |
|---|---|---|---|---|
| 6,115,753 A | * | 9/2000 | Joens | H04L 45/04 709/239 |
| 6,341,310 B1 | * | 1/2002 | Leshem | G06Q 30/02 714/E11.181 |

(Continued)

FOREIGN PATENT DOCUMENTS

| | | |
|---|---|---|
| CN | 102891786 A | 1/2013 |
| CN | 103869761 A | 6/2014 |

(Continued)

OTHER PUBLICATIONS

Alimpich et al., "Problem Child Indication in a Graphical User Interface," retrieved from IP.com on Nov. 6, 2023, published on Oct. 1, 1996 (2 pgs) (Year: 1996).*

(Continued)

*Primary Examiner* — Eric J. Bycer
(74) *Attorney, Agent, or Firm* — Sheppard, Mullin, Richter & Hampton LLP (57) ABSTRACT

Provided are a device state identification method, a device state identification apparatus, and an intelligent terminal. The method includes: obtaining state information of a device corresponding to a device identifier displayed in a scene list page, the scene list page being configured to display different device identifiers contained in different scenes; marking, in response to the state information of the device indicating that the device is in an abnormal state, the device identifier corresponding to the device based on the state information of the device.

20 Claims, 3 Drawing Sheets

(56) References Cited

U.S. PATENT DOCUMENTS

| | | | | |
|---|---|---|---|---|
| 6,456,306 | B1* | 9/2002 | Chin | H04L 43/0817 |
| | | | | 709/224 |
| 7,197,561 | B1* | 3/2007 | Lovy | H04L 43/10 |
| | | | | 714/48 |
| 7,519,909 | B2* | 4/2009 | Kuiawa | G06F 3/04817 |
| | | | | 715/734 |
| 8,490,006 | B1* | 7/2013 | Reeser | G05B 15/02 |
| | | | | 700/18 |
| 10,133,443 | B2* | 11/2018 | Von Dehsen | G05B 19/042 |
| 11,487,347 | B1* | 11/2022 | Brown | G06F 3/01 |
| 2002/0158910 | A1 | 10/2002 | Sharrow | |
| 2003/0163582 | A1* | 8/2003 | Inoue | H04L 41/0253 |
| | | | | 709/223 |
| 2003/0182125 | A1* | 9/2003 | Phillips | H04L 12/66 |
| | | | | 704/270.1 |
| 2003/0233660 | A1* | 12/2003 | Slemmer | H04L 12/2803 |
| | | | | 725/80 |
| 2004/0024571 | A1* | 2/2004 | Trinon | G06F 11/328 |
| | | | | 706/45 |
| 2007/0022185 | A1* | 1/2007 | Hamilton | H04L 41/085 |
| | | | | 709/220 |
| 2007/0239351 | A1* | 10/2007 | Sherrill | G05B 23/0267 |
| | | | | 702/188 |
| 2009/0305744 | A1* | 12/2009 | Ullrich | H04M 19/04 |
| | | | | 455/567 |
| 2010/0114944 | A1* | 5/2010 | Adler | G10L 13/027 |
| | | | | 707/E17.062 |
| 2011/0119517 | A1* | 5/2011 | Beeco | H04L 41/12 |
| | | | | 713/340 |
| 2012/0251016 | A1* | 10/2012 | Lyons | G06F 40/151 |
| | | | | 382/276 |
| 2012/0306620 | A1* | 12/2012 | Karaffa | G05B 23/027 |
| | | | | 340/6.1 |
| 2014/0006660 | A1* | 1/2014 | Frei | H04L 43/10 |
| | | | | 710/104 |
| 2014/0071834 | A1* | 3/2014 | Sun | H04L 45/507 |
| | | | | 370/242 |
| 2015/0082225 | A1* | 3/2015 | Shearer | H04L 12/2803 |
| | | | | 715/771 |
| 2015/0143268 | A1* | 5/2015 | Retlich | H04L 41/22 |
| | | | | 715/763 |
| 2015/0227568 | A1* | 8/2015 | Bertram | G06F 9/451 |
| | | | | 715/765 |
| 2015/0350031 | A1* | 12/2015 | Burks | H04W 76/16 |
| | | | | 715/736 |
| 2016/0014141 | A1* | 1/2016 | Ganapathy | H04L 67/10 |
| | | | | 726/28 |
| 2016/0124403 | A1* | 5/2016 | Fu | G05B 15/02 |
| | | | | 700/275 |
| 2016/0277204 | A1* | 9/2016 | Kang | H04L 12/2816 |
| 2017/0083220 | A1* | 3/2017 | Gao | G06F 3/04847 |
| 2017/0187809 | A1* | 6/2017 | Chen | H04L 12/6418 |
| 2017/0289766 | A1* | 10/2017 | Scott | H04W 8/005 |
| 2017/0352248 | A1* | 12/2017 | Shimizu | G08B 21/185 |
| 2018/0060153 | A1* | 3/2018 | Innes | H04L 41/06 |
| 2018/0181369 | A1* | 6/2018 | Tanaka | H04S 7/302 |
| 2019/0034309 | A1* | 1/2019 | Nayak | F24F 11/64 |
| 2019/0332513 | A1* | 10/2019 | Zhou | G06F 11/302 |
| 2020/0371488 | A1* | 11/2020 | Ackmann | G05B 19/0426 |
| 2021/0099336 | A1* | 4/2021 | Li | H04L 41/064 |
| 2023/0018598 | A1* | 1/2023 | Zhang | H04L 41/00 |
| 2023/0029568 | A1* | 2/2023 | Wang | F24F 11/38 |

FOREIGN PATENT DOCUMENTS

| | | |
|---|---|---|
| CN | 103914272 A | 7/2014 |
| CN | 104754821 A | 7/2015 |
| CN | 104808501 A | 7/2015 |
| CN | 105809881 A | 7/2016 |
| CN | 106452989 A | 2/2017 |
| CN | 106919060 A | 7/2017 |
| CN | 107765555 A | 3/2018 |
| CN | 108449241 A | 8/2018 |
| CN | 108594771 A | 9/2018 |
| CN | 104363154 B | 12/2018 |
| CN | 109245308 A | 1/2019 |
| CN | 109460172 A | 3/2019 |
| CN | 110134020 A | 8/2019 |
| CN | 110262261 A | 9/2019 |
| CN | 106452989 B | 12/2019 |
| CN | 110554615 A | 12/2019 |
| CN | 110855460 A | 2/2020 |
| CN | 111488088 A | 8/2020 |
| WO | 2017107521 A1 | 6/2017 |

OTHER PUBLICATIONS

International Search Report and Written Opinion dated May 26, 2021 in International Application No. PCT/CN2021/077095. English translation attached.

First Office Action from corresponding Chinese Application No. 202010263868.6, dated Jan. 25, 2021 . English translation attached.

The Second Office Action from corresponding Chinese Application No. 202010263868.6, dated Oct. 20, 2021. English translation attached.

Grant Notice & Supplementary Search from corresponding Chinese Application No. 202010263868.6, dated Mar. 23, 2022. English translation attached.

Extended European Search Report dated Oct. 4, 2023 received in European Patent Application No. EP21784253.3.

* cited by examiner

FIG. 1

```
Obtaining state information of a device corresponding to a
device identifier displayed in a scene list page, the scene list    S21
page being configured to display device identifiers contained
              in different scenes
```

```
Marking, in response to the state information of the device
indicating that the device is in an abnormal state, the device     S22
 identifier corresponding to the device based on the state
              information of the device
```

DEVICE STATE IDENTIFICATION METHOD AND APPARATUS, AND INTELLIGENT TERMINAL

CROSS-REFERENCE TO RELATED APPLICATIONS

This application is a continuation of International Application No. PCT/CN2021/077095 filed on Feb. 20, 2021, which claims priority to and the benefit of Chinese Patent Application No. 202010263868.6, filed with the China National Intellectual Property Administration on Apr. 7, 2020, which is incorporated herein by reference in its entirety.

FIELD

The present disclosure relates to the field of smart home technology, and more particularly, to a device state identification method and apparatus, an intelligent terminal and a computer-readable storage medium.

BACKGROUND

Currently, users can use smart home applications installed on intelligent terminals to control corresponding devices.

Figure 1:
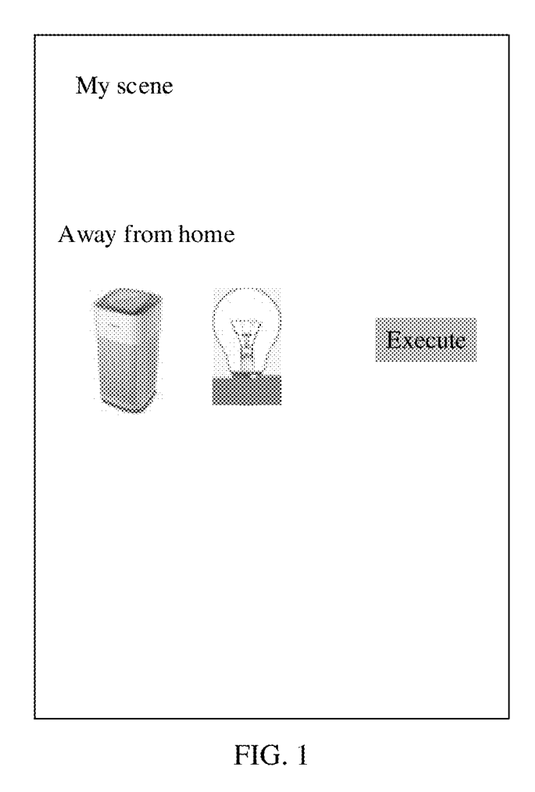
FIG. 1 is a schematic diagram of a scene list page according to the related art.

A smart home application includes a device display page and a scene list page. The device display page is used to display device identifiers of devices that have access to the smart home, and the scene list page is used to display device identifiers of devices in different scenes. For example, assuming that the devices that have access to the smart home include an air purifier, a light bulb and a speaker, and the devices involved in the scene "away from home" are the air purifier and the light bulb, then the device display page will display an identifier of the air purifier, an identifier of the light bulb and an identifier of the speaker, and the scene "away from home", the identifiers of the air purifier and the light bulb involved in the scene, as well as an "execute" button corresponding to the scene "away from home" will be displayed on the scene list page, as shown in FIG. 1. In this way, when the user clicks the "execute" button, each device in the scene "away from home" will be activated based on predetermined parameters, and an execution result will be fed back after the execution.

SUMMARY

In a first aspect, an embodiment of the present disclosure provides a device state identification method. The device state identification method is performed by an intelligent terminal. The method includes: obtaining state information of a device corresponding to a device identifier displayed in a scene list page, the scene list page being configured to display device identifiers contained in different scenes, and the state information comprising information on whether the device is abnormal; marking, in response to the state information of the device indicating that the device is in an abnormal state, the device identifier corresponding to the device based on the state information of the device; checking, in response to the state information of the device indicating that the device is in the abnormal state, whether another device in the same scene is linked to the device in the abnormal state; and marking, in response to a presence of the other device linked to the device in the abnormal state, the device identifier corresponding to the other device using a failure identifier.

In a second aspect, an embodiment of the present disclosure provides an intelligent terminal. The intelligent terminal includes a memory, a processor, and a computer program stored in the memory and executable on the processor. The processor, when executing the computer program, implements: obtaining state information of a device corresponding to a device identifier displayed in a scene list page, the scene list page being configured to display device identifiers contained in different scenes, and the state information comprising information on whether the device is abnormal; marking, in response to the state information of the device indicating that the device is in an abnormal state, the device identifier corresponding to the device based on the state information of the device; checking, in response to the state information of the device indicating that the device is in the abnormal state, whether another device in the same scene is linked to the device in the abnormal state; and marking, in response to a presence of the other device linked to the device in the abnormal state, the device identifier corresponding to the other device using a failure identifier.

In a third aspect, an embodiment of the present disclosure provides a non-transitory computer-readable storage medium. The computer-readable storage medium stores a computer program. The computer program, when executed by a processor, implements: obtaining state information of a device corresponding to a device identifier displayed in a scene list page, the scene list page being configured to display device identifiers contained in different scenes, and the state information comprising information on whether the device is abnormal; marking, in response to the state information of the device indicating that the device is in an abnormal state, the device identifier corresponding to the device based on the state information of the device; checking, in response to the state information of the device indicating that the device is in the abnormal state, whether another device in the same scene is linked to the device in the abnormal state; and marking, in response to a presence of the other device linked to the device in the abnormal state, the device identifier corresponding to the other device using a failure identifier.

BRIEF DESCRIPTION OF DRAWINGS

In order to clearly explain technical solutions of embodiments of the present disclosure, drawings used in the description of the embodiments or the related art are briefly described below.

DESCRIPTION OF EMBODIMENTS

In the following description, for the purpose of illustration rather than limitation, specific details such as a specific system structure and technology are set forth in order to provide a thorough understanding of the embodiments of the present disclosure. However, it will be apparent to those skilled in the art that the present disclosure may be practiced in other embodiments without these specific details. In other instances, detailed descriptions of well-known systems, apparatuses, circuits, and methods are omitted so as not to obscure the description of the present disclosure with unnecessary detail.

It is to be understood that, when used in the specification of the present disclosure and the appended claims, the term "comprising" or "including" indicates the presence of the described feature, integer, step, operation, element and/or component, but does not exclude the presence or addition of one or more other features, integers, steps, operations, elements, components and/or a combination thereof.

It should be understood that, as used in the specification of the present disclosure and the appended claims, the term "and/or" refers to and includes any and all possible combinations of one or more of the associated listed items.

As used in the specification of the disclosure and the appended claims, the term "if" may be contextually interpreted as "when" or "once" or "in response to determining" or "in response to detecting". Similarly, the phrase "if it is determined" or "if [the described condition or event] is detected" may be interpreted, depending on the context, to mean "once it is determined" or "in response to determining" or "once [the described condition or event] is detected" or "in response to detecting [the described condition or event]".

In addition, in the specification of the present disclosure and the appended claims, the terms "first", "second" and the like are only used for distinguishing purpose, and should not be construed as indicating or implying relative importance.

References in the specification of the present disclosure to "an embodiment" or "some embodiments" and the like mean that a particular feature, structure or characteristic described in connection with the embodiment is included in one or more embodiments of the present disclosure. Thus, presence of the phrases "in an embodiment," "in some embodiments," "in other embodiments," "in another embodiment," etc. at various places in this specification of the present disclosure does not necessarily refer to the same embodiment, but means "one or more but not all embodiments" unless specifically emphasized otherwise. The terms "including", "containing", "having" and their variants mean "including but not limited to" unless specifically emphasized otherwise.

Figure 2:
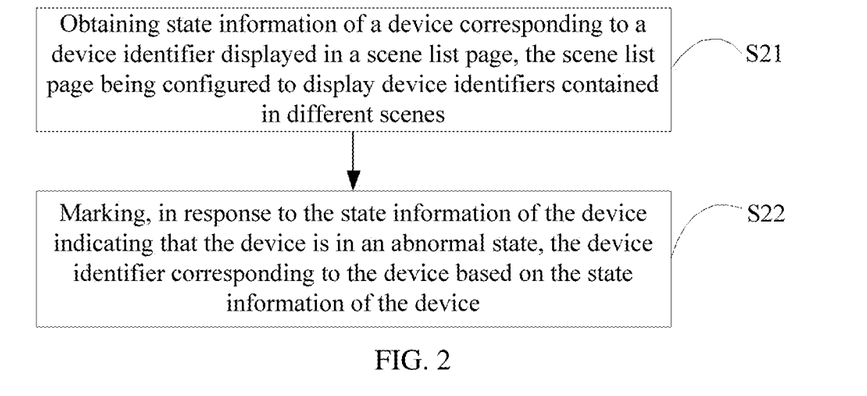
FIG. 2 is a flowchart of a device state identification method according to an embodiment of the present disclosure.
Figure 6:
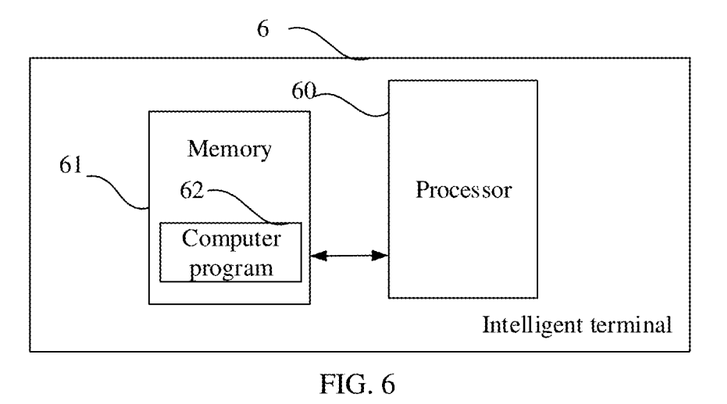
FIG. 6 is a schematic structural diagram of an intelligent terminal according to an embodiment of the present disclosure.

Referring to FIG. 2, an embodiment of the present disclosure provides a device state identification method performed by an intelligent terminal 6 (shown in FIG. 6). The device state identification method includes operations as follows.

At block S21, state information of a device corresponding to a device identifier displayed in a scene list page is obtained. The scene list page is configured to display device identifiers contained in different scenes.

At block S22, in response to the state information of the device indicating that the device is in an abnormal state, the device identifier corresponding to the device is marked based on the state information of the device.

In some embodiments, the operation at block S22 of marking, in response to the state information of the device indicating that the device is in the abnormal state, the device identifier corresponding to the device based on the state information of the device includes: in response to the state information of the device indicating that the device is in the abnormal state, marking the device identifier corresponding to the device with an icon based on the state information of the device, and/or, marking the device identifier corresponding to the device with a text based on the state information of the device.

In some embodiments, the device state identification method further includes: checking, in response to the state information of the device indicating that the device is in the abnormal state, whether another device in the same scene is linked to the device in the abnormal state; and marking, in response to a presence of the other device linked to the device in the abnormal state, the other device.

In some embodiments, the device state identification method further includes: generating, in response to the state information of the device indicating that the device is in the abnormal state, prompt information based on the state information of the device. The prompt information includes an entry for scene re-editing.

In some embodiments, the operation of obtaining the state information of the device corresponding to the device identifier displayed in the scene list page includes: obtaining, in response to detecting an access instruction for accessing the scene list page, the state information of the device corresponding to the device identifier displayed in the scene list page.

In some embodiments, the operation of obtaining the state information of the device corresponding to the device identifier displayed in the scene list page includes: obtaining, in response to detecting that a location of the intelligent terminal and/or current time satisfies a scene execution trigger condition for one scene in the scene list page, the state information of the device corresponding to the device identifier displayed in the scene list page.

In some embodiments, subsequent to marking the device identifier corresponding to the device based on the state information of the device, the device state identification method further includes: in response to detecting a manual execution instruction, controlling each device in a corresponding scene based on the manual execution instruction, and feeding back an execution result using a first feedback scheme; and in response to detecting an automatic execution instruction issued by the intelligent terminal, controlling each device in a corresponding scene based on the automatic execution instruction, and feeding back an execution result using a second feedback scheme different from the first feedback scheme.

Figure 5:
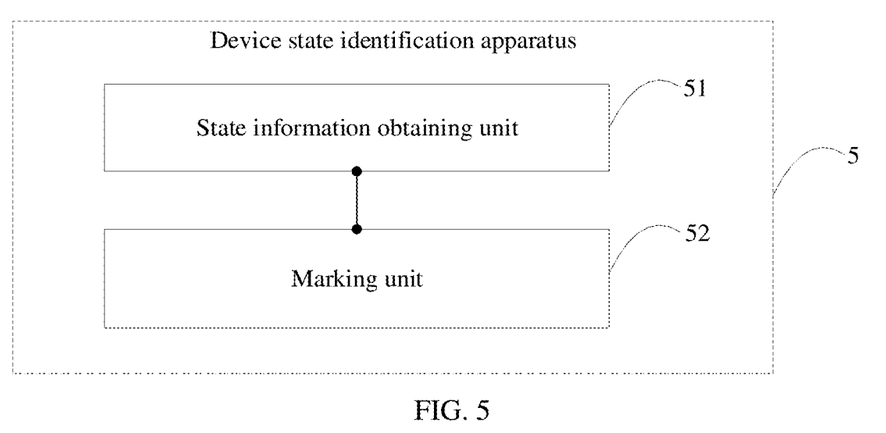
FIG. 5 is a schematic structural diagram of a device state identification apparatus according to an embodiment of the present disclosure.

Referring to FIG. 5, an embodiment of the present disclosure further provides a device state identification apparatus 5 applied in an intelligent terminal 6 (shown in FIG. 6). The device state identification apparatus 5 includes a state information obtaining unit 51 and a marking unit 52. The obtaining unit 51 is configured to obtain state information of a device corresponding to a device identifier displayed in a scene list page. The scene list page is configured to display device identifiers contained in different scenes. The marking unit 52 is configured to mark, in response to the state information of the device indicating that the device is in an abnormal state, the device identifier corresponding to the device based on the state information of the device.

Referring to FIG. 6, the present disclosure also provides an intelligent terminal 6. The intelligent terminal 6 includes a memory 61, a processor 60 and a computer program 62 stored in the memory 61 and executable by the processor 60. The processor 60, when executing the computer program 62, implements: obtaining state information of a device corresponding to a device identifier displayed in a scene list page, the scene list page being configured to display device identifiers contained in different scenes; and marking, in response to the state information of the device indicating that the device is in an abnormal state, the device identifier corresponding to the device based on the state information of the device.

In some embodiments, the processor 60, when executing the computer program 62, further implements: in response to the state information of the device indicating that the device is in the abnormal state, marking the device identifier corresponding to the device with an icon based on the state information of the device, and/or, marking the device identifier corresponding to the device with a text based on the state information of the device.

In some embodiments, the processor 60, when executing the computer program 62, further implements: checking, in response to the state information of the device indicating that the device is in the abnormal state, whether another device in the same scene is linked to the device in the abnormal state; and marking, in response to a presence of the other device linked to the device in the abnormal state, the other device.

In some embodiments, the processor 60, when executing the computer program 62, further implements: generating, in response to the state information of the device indicating that the device is in the abnormal state, prompt information based on the state information of the device. The prompt information includes an entry for scene re-editing.

In some embodiments, the processor 60, when executing the computer program 62, further implements: obtaining, in response to detecting an access instruction for accessing the scene list page, the state information of the device corresponding to the device identifier displayed in the scene list page.

In some embodiments, the processor 60, when executing the computer program 62, further implements: obtaining, in response to detecting that a location of the intelligent terminal and/or current time satisfies a scene execution trigger condition for one scene in the scene list page, the state information of the device corresponding to the device identifier displayed in scene list page.

In some embodiments, the processor 60, when executing the computer program 62, further implements: in response to detecting a manual execution instruction, controlling each device in a corresponding scene based on the manual execution instruction, and feeding back an execution result using a first feedback scheme; and in response to detecting an automatic execution instruction issued by the intelligent terminal, controlling each device in a corresponding scene based on the automatic execution instruction, and feeding back an execution result using a second feedback scheme different from the first feedback scheme.

The present disclosure also provides a computer-readable storage medium. The computer-readable storage medium stores a computer program. The computer program, when executed by a processor, implements: obtaining state information of a device corresponding to a device identifier displayed in the scene list page, the scene list page being configured to display device identifiers contained in different scenes; and marking, in response to the state information of the device indicating that the device is in an abnormal state, the device identifier corresponding to the device based on the state information of the device.

In some embodiments, the computer program, when executed by the processor, further implements: in response to the state information of the device indicating that the device is in the abnormal state, marking the device identifier corresponding to the device with an icon based on the state information of the device, and/or, marking the device identifier corresponding to the device with a text based on the state information of the device.

In some embodiments, the computer program, when executed by the processor, further implements: checking, in response to the state information of the device indicating that the device is in the abnormal state, whether another device in the same scene is linked to the device in the abnormal state; and marking, in response to a presence of the other device linked to the device in the abnormal state, the other device.

In some embodiments, the computer program, when executed by the processor, further implements: generating, in response to the state information of the device indicating that the device is in the abnormal state, prompt information based on the state information of the device. The prompt information includes an entry for scene re-editing.

In some embodiments, the computer program, when executed by the processor, further implements: obtaining, in response to detecting an access instruction for accessing the scene list page, the state information of the device corresponding to the device identifier displayed in the scene list page.

In some embodiments, the computer program, when executed by the processor, further implements: obtaining, in response to detecting that a location of the intelligent terminal and/or current time satisfies a scene execution trigger condition for one scene in the scene list page, the state information of the device corresponding to the device identifier displayed in the scene list page.

In some embodiments, the computer program, when executed by the processor, further implements: in response to detecting a manual execution instruction, controlling each device in a corresponding scene based on the manual execution instruction, and feeding back an execution result using a first feedback scheme; and in response to detecting an automatic execution instruction issued by the intelligent terminal, controlling each device in a corresponding scene based on the automatic execution instruction, and feeding back an execution result using a second feedback scheme different from the first feedback scheme.

Example 1:

The term "scene" refers to a function in a smart home application. In a scene, a plurality of devices can be controlled in a combined manner to perform user-specified tasks so as to achieve intelligent linkage in the whole house. The device here refers to a device that can connect to the network via various protocols such as Wi-Fi or Bluetooth®, so as to present its data and state online in real time. When a scene is executed by a user, a possible execution result is "execution partially successful", from which the user cannot determine which part is successfully executed and which part fails in execution. That is, more effective information cannot be obtained from the above execution result. In order to solve the technical problem, the applicant finds through analysis that the execution result "execution partially successful" is generated because some devices in the executed scene are no longer devices in the smart home that can be controlled by the intelligent terminal, that is, the device identifiers corresponding to the devices have been deleted from the device display page, or because some devices in the executed scene are disconnected from the network, that is, the devices are offline.

In practical applications, after the user deletes a certain device identifier in the device display page, the scene including the device identifier still retains the device identifier in the scene list page, rather than deleting the corresponding device identifier in the scene list page in a linked manner as the device identifier is deleted from the device display page. This is because deleting the corresponding device identifier from the scene list page in a linked manner may cause some trouble to the user. For example, suppose that device A identifier in scene 1 has been deleted in the device display page. However, the user may still remember that he/she added device A identifier in scene 1. In this case, if device A identifier in scene 1 is deleted in a linked manner from the scene list page, the user may doubt his/her memory, that is, it will cause some trouble to the user. In the present disclosure, in order to avoid deleting directly the corresponding device identifier in the scene list page in a linked manner, and to ensure that the user obtains more effective information when the fed-back execution result is "execution partially successful", the corresponding device identifier is marked in the scene list page when the device identifier has been deleted from the device display page, or the device is offline. In this way, even if the fed-back execution result is "execution partially successful", the user can know that the deleted device failed in execution, or that the offline device failed in execution.

Device state identification methods according to embodiments of the present disclosure will be described in detail below.

FIG. 2 illustrates a flowchart of a device state identification method according to an embodiment of the present disclosure. The device state identification method is performed by an intelligent terminal, and the details are as follows.

At block S21, state information of a device corresponding to a device identifier displayed in a scene list page is obtained. The scene list page is configured to display device identifiers contained in different scenes.

The scene list page displays different scenes set by the user and the device identifiers contained in the scenes, and the device identifiers and the devices are in a one-to-one correspondence. It should be pointed out that one scene may contain one device identifier, or two or more device identifiers, which is specifically related to the number of devices actually contained in the scene. Referring to the schematic diagram of the scene list page in FIG. 1, the scene list page has only one scene "away from home" set by the user, and the scene "away from home" contains the identifier of the air purifier and the identifier of the light bulb. It should be pointed out that in the present disclosure, in addition to or instead of being represented by an icon as shown in FIG. 1, the device identifier (such as the identifier of the air purifier) may also be represented by a text (such as "air purifier").

The state information of the device includes information on whether the device is abnormal. The information on whether the device is abnormal includes information on whether the device is deleted and information on whether the device is offline.

In some embodiments, in order to obtain more accurate state information of the device, and in order to reduce a frequency of obtaining the state information of the device, the state information of the device is obtained only when the user accesses the scene list page. In this case, the action at block S21 includes: obtaining, in response to detecting an access instruction for accessing the scene list page, the state information of the device corresponding to the device identifier displayed in the scene list page.

In the embodiment, the state information of the device corresponding to each device identifier displayed in the scene list page is obtained only in response to detecting that the user clicks on the scene list page and an access instruction is issued. Before the user issues the access instruction, even if the device is in the abnormal state (for example, the device is deleted or offline), the state information of the device is not obtained. It should be pointed out that each device identifier here refers to the device identifier corresponding to each of the different devices, that is, the state information of the device corresponding to each device identifier is obtained only once. For example, if scene 1 contains the identifier of the air purifier, scene 2 also contains the identifier of the air purifier, and the state information of the air purifier corresponding to the identifier of the air purifier contained in scene 1 has been obtained, then in scene 2, the obtained state information of the air purifier can be directly used without obtaining it from elsewhere.

In some embodiments, in order to obtain accurate state information of the device in a timely manner, and in order to reduce the frequency of obtaining the state information of the device, the state information of the device is obtained before the scene is executed. In this case, the action at block S21 includes: obtaining, in response to detecting that a location of the intelligent terminal and/or current time satisfies a scene execution trigger condition for one scene in the scene list page, the state information of the device corresponding to the device identifier displayed in the scene list page.

In the embodiment, the user can set that, when a scene execution trigger condition is satisfied for a scene, the corresponding scene is automatically executed. The scene execution trigger condition may be that the location satisfies the requirement, the time satisfies the requirement, or both the location and the time satisfy the requirements. For example, assuming that scene 1 is automatically triggered when the location of the intelligent terminal is B, the state information of the device corresponding to the device identifier displayed in the scenario list page is obtained when it is detected that the location of the intelligent terminal is B. Otherwise, the state information of the device is not obtained even if the device is deleted or offline. In this way, the frequency of obtaining the state information of the device is reduced.

In some embodiments, the execution of the scene can be automatically triggered, and the user does not necessarily need to know the state information of the device when the scene is automatically triggered to be executed. Therefore, in order to further reduce the frequency of obtaining the state information of the device, if an application startup instruction issued by the user is detected within a predetermined time length after the execution result is obtained, then the state information of the device is obtained. In this case, the operation of obtaining, in response to detecting the location of the intelligent terminal and/or the current time satisfies the scene execution trigger condition for one scene in the scene list page, the state information of the device corresponding to the device identifier displayed in the scene list page includes: triggering, in response to detecting that the location of the intelligent terminal and/or the current time satisfies the scene execution trigger condition for one scene in the scene list page, a corresponding scene to be automatically executed to obtain an execution result; and obtaining the state information of the device corresponding to the device identifier displayed in the scene list page, in response to detecting, within a predetermined time length after the execution result is obtained, an application startup instruction issued by the user. The application startup instruction is configured to start a smart home application for which the execution result is obtained.

In the embodiment, it is assumed that execution result A is obtained after a certain scene in the scene list page of smart home application A is automatically executed. When it is detected that the user starts smart home application A (for example, double-clicking smart home application A) within the predetermined time length (for example, 5 minutes) after execution result A is obtained, the state information of the device corresponding to the device identifier displayed in the scene list page is obtained. When the scene is automatically executed, the user does not need to open the scene list page, that is, the user cannot know how each device identifier is marked from the scene list page. Accordingly, when the execution result is "execution partially successful", and the user starts the smart home application within the predetermined time length after the execution result is obtained, it indicates that the user wants to know which part of the devices has not been successfully executed. At this time, the intelligent terminal obtains the state information of the device, which can ensure the timeliness of subsequent marking of the corresponding device identifier.

At block S22, in response to the state information of the device indicating that the device is in an abnormal state, the device identifier corresponding to the device is marked based on the state information of the device.

Specifically, when the device has been deleted (specifically, when the device identifier displayed in the device display page is deleted, it means that the device corresponding to the device identifier has been deleted), the corresponding device identifier is marked by a predetermined deletion identifier; and when the device is offline, the corresponding device identifier is marked by a predetermined offline identifier. The predetermined deletion identifier is different from the predetermined offline identifier.

In some embodiments, the action at block S22 includes: in response to the state information of the device indicating that the device is in the abnormal state, marking the device identifier corresponding to the device with an icon based on the state information of the device, and/or marking the device identifier corresponding to the device with a text based on the state information of the device.

Figure 3:
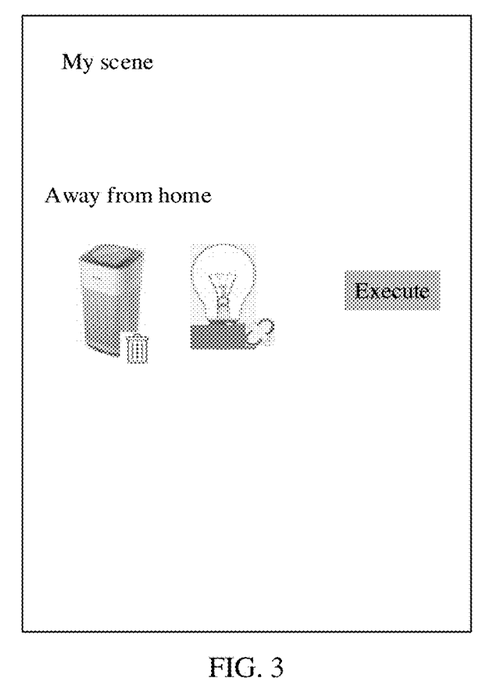
FIG. 3 is a schematic diagram of marking a device identification with an icon according to an embodiment of the present disclosure.

Specifically, it is assumed that the predetermined deletion identifier is an icon of "trash can", and the predetermined offline identifier is an icon of "broken chain". FIG. 3 shows a schematic diagram of marking a device identifier with an icon. In FIG. 3, in the scene "away from home", a deletion identifier of "trash can" is marked next to the identifier of the air purifier, which indicates that the air purifier has been deleted; and an offline identifier of "broken chain" is marked next to the identifier of the light bulb, which indicates that the light bulb is offline.

In the embodiment of the present disclosure, the state information of the device corresponding to the device identifier displayed in the scene list page is obtained, and when the state information of the device indicates that the device is in the abnormal state, the device identifier corresponding to the device is marked based on the state information of the device. Since the state information of the device can indicate whether the device is in the abnormal state (such as whether it is deleted or whether it is offline), the corresponding device identifier is marked based on the state information of the device, so that when obtaining the execution result of "execution partially successful", the user can know in time from the scene list page which device has been deleted by the device display page and which device is offline, thereby improving the user experience.

In some embodiments, since a linkage relationship may exist between devices in the same scene, when a device in the linkage relationship is deleted or offline, the other party in the linkage relationship will be affected, that is, when the scene is executed, the other party in the linkage relationship also fails in execution. Therefore, in order for the user to know that the other party in the linkage relationship also fails when the scene is executed, the other party in the linkage relationship is marked as well. That is, the device state identification method further includes: checking, in response to the state information of the device indicating that the device is in the abnormal state, whether another device in the same scene is linked to the device in the abnormal state; and marking, in response to a presence of the other device linked to the device in the abnormal state, the other device.

In the embodiment, a linkage failure identifier may be preset to mark a corresponding device identifier. For example, it is assumed that the scene "away from home" contains three devices which are an air purifier, a light bulb, and a speaker, and the following linkage relationship exists between the air purifier and the light bulb: the air purifier is turned on, and after the value of PM2.5 of the air satisfies a requirement, the light bulb is turned on. When the air purifier is deleted, the execution of the scene "away from home" will lead to a failure of the execution of the air purifier and the light bulb. Therefore, in order to enable the user to determine, when obtaining "execution partially successful", all the devices that were unsuccessfully executed and why the devices are unsuccessfully executed, in the embodiment the identifier of the air purifier is marked with the predetermined deletion identifier, and the identifier of the light bulb is marked with the predetermined linkage failure identifier.

In some embodiments, if a scene is executed in which a device that is deleted or offline is involved, the device will be executed successfully. This may cause the function of the executed scene to fail to satisfy the user's needs. Therefore, in order to facilitate the user to quickly set a scene with a new function, the device state identification method further includes: generating, in response to the state information of the device indicating that the device is in the abnormal state, prompt information based on the state information of the device. The prompt information includes an entry for scene re-editing.

Figure 4:
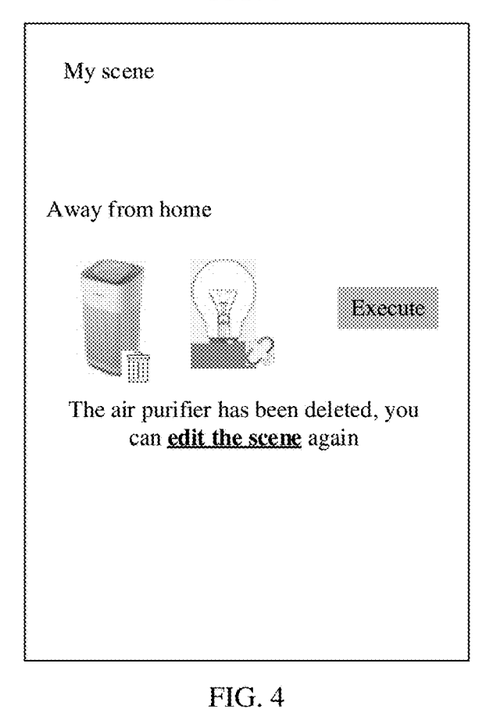
FIG. 4 is a schematic diagram of displaying generated prompt information in a scene list page according to an embodiment of the present disclosure.

In the embodiment, when the prompt information includes other contents besides the entry for scene re-editing, a display mode of the entry for setting scene-editing is set to be different from a display mode of the other contents of the prompt information. As shown in FIG. 4, the generated prompt information is "The air purifier has been deleted, and you can edit the scene again", and here the "edit the scene" is the entry for the scene re-editing. According to FIG. 4, the display mode of the "edit the scene" is different from the display mode of the other contents of the prompt information. When the user clicks "edit the scene", a scene editing interface will be entered.

In some embodiments, when a scene is deleted in addition to a device, the generated prompt information further includes a name of the device name and a name of the scene, and the name of the device is before the name of the scene in order. For example, assuming that the device "air purifier" is deleted and the scene "away from home" is deleted, then the generated prompt information is: the device "air purifier" is deleted, the scene "away from home" is deleted, and you can edit the scene again. After the scene is deleted, the user can no longer see the corresponding scene, while after the device is deleted, the corresponding device identifier can still be seen in the scene. Therefore, displaying the name of the device preferentially will help the user obtain more information from the prompt information.

In some embodiments, when the scene is executed in different ways, the execution result is fed back in different feedback schemes. That is, subsequent to marking the device identifier corresponding to the device based on the state information of the device, the device state identification method further includes: in response to detecting a manual execution instruction, controlling each device in a corresponding scene based on the manual execution instruction, and feeding back an execution result using a first feedback scheme; and in response to detecting an automatic execution instruction issued by the intelligent terminal, controlling each device in a corresponding scene based on the automatic execution instruction, and feeding back an execution result using a second feedback scheme. The second feedback scheme is different from the first feedback scheme.

In the embodiment, when the user manually executes the scene (that is, the user manually executes the scene by clicking "execute" button in FIG. 1), the execution result is fed back using the first feedback scheme; and when the location of the intelligent terminal and/or the current time satisfies the scene execution trigger condition for one scene in the scenario list page, the scene is automatically executed by the intelligent terminal, and at this time, the execution result is fed back using the second feedback scheme. For example, since the user manually executes the scene through the scene list page, the first feedback scheme may be a text feedback, that is, the execution result in the form of text is displayed in the scene list page. For another example, since the user does not need to enter the scene list page when the intelligent terminal automatically executes the scene, the second feedback scheme can be a voice feedback, that is, it can be realized by the voice output by the intelligent terminal, without the user having to open the scene list page of the smart home application. Since different feedback schemes are selected depending on different scene execution ways to feed back the execution result, the user obtains the execution result in a more flexible manner, which ensures that the execution result is obtained in a more timely manner.

It should be understood that the values of the sequence numbers of the actions in the above embodiments does not imply the sequence of execution. The execution sequence of each process should be determined by its function and internal logic, and should not constitute any limitation to the implementation process of the embodiments of the present disclosure.

Corresponding to the device state identification method described in the above embodiments, FIG. 5 shows a structural block diagram of a device state identification apparatus according to an embodiment of the present disclosure. For convenience of description, only the part related to the embodiment of the present disclosure is shown.

Referring to FIG. 5, the device state identification apparatus 5 is applied in an intelligent terminal, and includes a state information obtaining unit and a marking unit. The state information obtaining unit is configured to obtain state information of a device corresponding to a device identifier displayed in a scene list page. The scene list page is configured to display device identifiers contained in different scenes. The marking unit is configured to mark, in response to the state information of the device indicating that the device is in an abnormal state, the device identifier corresponding to the device based on the state information of the device.

In the embodiment of the present disclosure, the state information of the device corresponding to the device identifier displayed in the scene list page is obtained, and in response to the state information of the device indicating that the device is in the abnormal state, the device identifier corresponding to the device is marked based on the state information of the device. Since the state information of the device can indicate whether the device has been deleted or whether the device has been offline, the corresponding device identifier is marked based on the state information of the device, so that when obtaining the execution result "execution partially successful", the user can timely learn, from the scene list page, which device has been deleted from the device display page and which device is offline, thereby improving the user experience.

In some embodiments, the marking unit is specifically configured to: in response to the state information of the device indicating that the device is in the abnormal state, mark the device identifier corresponding to the device with an icon based on the state information of the device, and/or mark the device identifier corresponding to the device with a text based on the state information of the device.

In some embodiments, since a linkage relationship may exist between devices in the same scene, when a device in the linkage relationship is deleted or offline, the other party in the linkage relationship will be affected, that is, when the scene is executed, the other party in the linkage relationship also fails in execution. Therefore, in order for the user to know that the other party in the linkage relationship also fails when the scene is executed, the other party in the linkage relationship is marked as well. In this case, the device state identification apparatus 5 further includes a linked-device detection unit and a linked-device marking unit. The linked-device detection unit is configured to check, in response to the state information of the device indicating that the device is in the abnormal state, whether another device in the same scene is linked to the device in the abnormal state. The linked-device marking unit is configured to mark, in response to a presence of the other device linked to the device in the abnormal state, the other device.

In some embodiments, the device state identification apparatus further includes: a prompt information generating unit configured to generate, in response to the state information of the device indicating that the device is in the abnormal state, prompt information based on the state information of the device. The prompt information includes an entry for scene re-editing.

In the embodiment, when the prompt information includes other contents besides the entry for scene re-editing, a display mode of the entry for setting scene-editing is set to be different from a display mode of the other contents of the prompt information.

In some embodiments, when a scene is deleted in addition to a device, the generated prompt information further includes a name of the device and a name of the scene, and the name of the device is before the name of the scene in order.

In some embodiments, in order to obtain more accurate state information of the device, and to reduce the frequency of obtaining the state information of the device, the state information of the device is obtained only when the user accesses the scene list page. In this case, the state information obtaining unit is specifically configured to: obtain, in response to detecting an access instruction for accessing the scene list page, the state information of the device corresponding to the device identifier displayed in the scene list page.

In this embodiment, the state information of the device corresponding to each device identifier displayed in the scene list page is obtained only in response to detecting that the user clicks on the scene list page and an access instruction is issued. Before the user issues the access instruction, even if the device is deleted or offline, the state information of the device is not obtained. It should be pointed out that each device identifier here refers to the device identifier corresponding to each of the different devices, that is, the state information of the device corresponding to each device identifier is obtained only once.

In some embodiments, in order to obtain accurate state information of the device in a timely manner, and in order to reduce the frequency of obtaining the state information of the device, the state information of the device is obtained before the scene is executed. In this case, the state information obtaining unit is specifically configured to: obtain, in response to detecting that a location of the intelligent terminal and/or current time satisfies a scene execution trigger condition for one scene in the scene list page, the state information of the device corresponding to the device identifier displayed in the scene list page.

In the embodiment, the user can set that, when a scene execution trigger condition is satisfied for a scene, the corresponding scene is automatically executed. The scene execution trigger condition may be that the location satisfies the requirement, the time satisfies the requirement, or both the location and the time satisfy the requirements.

In some embodiments, the state information obtaining unit is specifically configured to: trigger, in response to detecting that the location of the intelligent terminal and/or the current time satisfies the scene execution trigger condition for one scene in the scene list page, a corresponding scene to be automatically executed to obtain an execution result; and obtain the state information of the device corresponding to the device identifier displayed in the scene list page, in response to detecting, within a predetermined time length after the execution result is obtained, an application startup instruction issued by the user. The application startup instruction is configured to start a smart home application for which the execution result is obtained.

In some embodiments, when the scene is executed in different ways, the execution result is fed back in different feedback schemes. That is, the device state identification apparatus 5 further includes a first execution result feedback unit and a second execution result feedback unit. The first execution result feedback unit is configured to: in response to detecting a manual execution instruction, control each device in a corresponding scene based on the manual execution instruction, and feed back an execution result using a first feedback scheme. The second execution result feedback unit is configured to: in response to detecting an automatic execution instruction issued by the intelligent terminal, control each device in a corresponding scene based on the automatic execution instruction, and feed back an execution result using a second feedback scheme. The second feedback scheme is different from the first feedback scheme.

It should be noted that the information exchange between the above-mentioned apparatuses/units, the execution process and other contents are based on the same concept as in the method embodiments of the present disclosure. For specific functions and resulting technical effects, reference may be made to the method embodiments section, which will not be repeated here.

FIG. 6 is a schematic structural diagram of an intelligent terminal according to an embodiment of the present disclosure. As shown in FIG. 6, the intelligent terminal 6 in the embodiment includes: at least one processor 60 (only one processor is shown in FIG. 6), a memory 61, and a computer program 62 that is stored in the memory 61 and executable on the at least one processor 60. The processor 60, when executing the computer program 62, implements the steps in any of the foregoing method embodiments, including: obtaining state information of a device corresponding to a device identifier displayed in a scene list page, the scene list page being configured to display device identifiers contained in different scenes; and marking, in response to the state information of the device indicating that the device is in an abnormal state, the device identifier corresponding to the device based on the state information of the device.

The intelligent terminal 6 may be a computing device such as a desktop computer, a notebook, a palmtop computer and a cloud server. The intelligent terminal may include, but is not limited to, the processor 60 and the memory 61. Those skilled in the art can understand that FIG. 6 is only an example of the intelligent terminal 6, and does not constitute a limitation on the intelligent terminal 6, which may include more or less components than are shown in the figure, or combine some components, or include different components, for example, it may also include input and output devices, a network access device, and the like.

The so-called processor 60 may be a Central Processing Unit (CPU), and the processor 60 may also be another general-purpose processor, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. The general-purpose processor may be a microprocessor or the processor may be any conventional processor or the like.

In some embodiments, the memory 61 may be an internal storage unit of the intelligent terminal 6, such as a hard disk or a memory of the intelligent terminal 6. In other embodiments, the memory 61 may also be an external storage device of the intelligent terminal 6, such as a plug-in hard disk, a Smart Media Card (SMC), a Secure Digital (SD) card, a Flash Card, etc. provided in the intelligent terminal 6. Further, the memory 61 may also include both the internal storage unit of the intelligent terminal 6 and the external storage device of the intelligent terminal 6. The memory 61 is configured to store an operating system, an application program, a Boot Loader, data, and other programs, such as program codes of the computer program. The memory 61 can further be configured to temporarily store data that has been output or will be output.

It should be clear to those skilled in the art that, for the sake of convenience and conciseness of description, the above-mentioned division of functional units and modules is just given as an example. In practical applications, the above-mentioned functions may be assigned to different functional units and modules as needed. That is, an internal structure of the apparatus may be divided into different functional units or modules to implement all or some of the above-mentioned functions. Individual functional units and modules in the present embodiment may be integrated in a processing unit, or may exist physically separately, or two or more units may be integrated in a single unit. The integrated unit may be implemented either in the form of hardware or in the form of software functional units. In addition, names of the functional units and modules are only for the purpose of distinction and are not used to limit the scope of the present disclosure. Specific working processes of the units and modules in the above system may be learned by referring to the corresponding processes in the aforementioned method embodiment, and will not be repeated here.

An embodiment of the present disclosure also provides a network device. The network device includes: at least one processor, a memory, and a computer program stored in the memory and executable on the at least one processor. The processor, when executing the computer program, implements the steps in any of the foregoing method embodiments.

An embodiment of the present disclosure further provides a computer-readable storage medium. A computer program is stored in the computer-readable storage medium. The computer program, when executed by a processor, implements the steps in each of the foregoing method embodiments.

An embodiment of the present disclosure provides a computer program product. The computer program product, when executed by a mobile terminal, causes the mobile terminal to implement the steps in each of the foregoing method embodiments.

The integrated unit may be stored in a computer-readable storage medium if implemented in the form of software functional units and sold or used as a stand-alone product. Based on such understanding, all or part of the process in any of the above method embodiments of the present disclosure may be realized by a computer program instructing the relevant hardware. The computer program may be stored in a computer-readable storage medium. When the computer program is executed by a processor, the steps of each of the above method embodiments may be performed. The computer program may include computer program codes, and the computer program codes may be in the form of source codes, in the form of object codes, in the form of an executable file or in some intermediate form, and so on. The computer-readable medium may at least include: any entity or apparatus capable of carrying the computer program codes to a photographing apparatus/terminal device, a recording medium, a computer memory, a Read-Only Memory (ROM), a Random Access Memory (RAM), an electric carrier signal, a telecommunication signal, and software distribution media, such as a USB flash drive, a removable hard disk, a floppy disk, an optical disk. In some jurisdictions, according to legislation and patent practice, computer-readable medium does not include electric carrier signals and telecommunication signals.

In the above embodiments, the description of each embodiment has its own focus, and the parts that are not described in detail in one embodiment may be learned by referring to the relevant descriptions of other embodiments.

A person of ordinary skill in the art may realize that the units and algorithmic steps of the embodiments described in conjunction with the embodiments disclosed herein may be implemented with electronic hardware, or a combination of computer software and electronic hardware. Whether to implement these functions in hardware or software may depend on particular applications and design constraints of the technical solution. The skilled person in the art may apply a different method to implement the described functions for each particular application, but such implementations should not be considered as beyond the scope of the present disclosure.

In the embodiments provided in the present embodiment, it should be understood that the disclosed apparatus/network terminal and method may be implemented in other ways. For example, the apparatus/network device embodiments described above are only exemplary. For example, the division of the modules or units described is performed based on logical functions, and may be done in another way when actually implemented. For example, multiple units or components may be combined or may be integrated into another system, or some features may be omitted or not implemented. Further, the mutual coupling or direct coupling or communication connection shown or discussed may be an indirect coupling or communication connection through some interfaces, apparatuses or units. The connection may be electrical, mechanical or in other forms.

The units illustrated as separate components may or may not be physically separated, and the components displayed as units may or may not be physical units, i.e., they may be located in one place or may be distributed across a plurality of network units. Some or all of these units may be selected according to actual needs to achieve the purpose of the present embodiment.

The embodiments described above are only used to illustrate, but not to limit, the technical solution of the present disclosure. Despite the detailed description of the present disclosure with reference to the foregoing embodiments, it should be understood by any ordinary skilled person in the art that the technical solutions recorded in the foregoing embodiments may be modified, or equivalent replacement may be performed for some of the technical features. These modifications or replacements do not deviate the essence of the technical solutions away from the spirit and scope of the technical solutions of the embodiments of the present disclosure, and shall be included in the scope of protection of the present disclosure.

What is claimed is:

1. A device state identification method, performed by an intelligent terminal, the device state identification method comprising:
    obtaining state information of a smart home device corresponding to a device identifier displayed in a smart home scene list page, the smart home scene list page being configured to list different smart home scenes and display, for each of the listed smart home scenes, device identifiers contained in the smart home scene, in each smart home scene a plurality of smart home devices being controlled in a combined manner to perform a user-specified task, and the state information comprising information on whether the smart home device is abnormal;
    marking, in response to the state information of the smart home device indicating that the smart home device is in an abnormal state, the device identifier corresponding to the smart home device based on the state information of the smart home device;
    checking, in response to the state information of the smart home device indicating that the smart home device is in the abnormal state, other smart home devices in the same smart home scene to determine whether another smart home device in the same smart home scene is linked to the smart home device in the abnormal state, wherein the another smart home device in the same smart home scene being linked to the smart home device indicates that the another smart home device is dependent on the smart home device in the same smart home scene, and when the smart home device is deleted or offline, the another smart home device will not be triggered by the smart home device to operate; and
    marking, for the same smart home scene in the smart home scene list page in response to a presence of the another smart home device in the same smart home scene linked to the smart home device in the abnormal state, the device identifier corresponding to the another smart home device using a linkage failure identifier indicating that the another smart home device in the same smart home scene fails due to being linked to the smart home device in the abnormal state.

2. The device state identification method according to claim 1, wherein said marking, for the same smart home scene in the smart home scene list page in response to the state information of the smart home device indicating that the smart home device is in the abnormal state, the device identifier corresponding to the smart home device based on the state information of the smart home device comprises at least one of:

in response to the state information of the smart home device indicating that the smart home device is in the abnormal state, marking the device identifier corresponding to the smart home device with an icon based on the state information of the smart home device, and marking the device identifier corresponding to the smart home device with a text based on the state information of the smart home device.

3. The device state identification method according to claim 1, wherein the information on whether the smart home device is abnormal comprises information on whether the smart home device is deleted and information on whether the smart home device is offline.

4. The device state identification method according to claim 1, wherein the device identifier corresponding to the smart home device in the abnormal state is marked using a failure identifier different from the linkage failure identifier, the failure identifier being a predetermined deletion identifier or a predetermined offline identifier, the predetermined deletion identifier being different from the predetermined offline identifier.

5. The device state identification method according to claim 1, further comprising:

generating, in response to the state information of the smart home device indicating that the smart home device is in the abnormal state, prompt information based on the state information of the smart home device, the prompt information comprising an entry for smart home scene re-editing.

6. The device state identification method according to claim 1, wherein said obtaining the state information of the smart home device corresponding to the device identifier displayed in the smart home scene list page comprises:

obtaining, in response to detecting an access instruction for accessing the smart home scene list page, the state information of the smart home device corresponding to the device identifier displayed in the smart home scene list page.

7. The device state identification method according to claim 1, wherein said obtaining the state information of the smart home device corresponding to the device identifier displayed in the smart home scene list page comprises at least one of:

obtaining, in response to detecting that a location of the intelligent terminal and current time satisfies a scene execution trigger condition for one smart home scene in the smart home scene list page, the state information of the smart home device corresponding to the device identifier displayed in the smart home scene list page.

8. The device state identification method according to claim 7, further comprising, subsequent to the marking the device identification corresponding to the smart home device based on the state information of the smart home device:

in response to detecting a manual execution instruction, controlling each smart home device in a corresponding smart home scene based on the manual execution instruction, and feeding back an execution result using a first feedback scheme; and in response to detecting an automatic execution instruction issued by the intelligent terminal, controlling each smart home device in a corresponding smart home scene based on the automatic execution instruction, and feeding back an execution result using a second feedback scheme different from the first feedback scheme.

9. An intelligent terminal, comprising:

a memory;

a processor; and a computer program stored in the memory and executable on the processor, wherein the processor, when executing the computer program, implements:

obtaining state information of a smart home device corresponding to a device identifier displayed in a smart home scene list page, the smart home scene list page being configured to list different smart home scenes and display, for each of the listed smart home scenes, device identifiers contained in the smart home scene, in each smart home scene a plurality of smart home devices being controlled in a combined manner to perform a user-specified task, and the state information comprising information on whether the smart home device is abnormal;

marking, in response to the state information of the smart home device indicating that the smart home device is in an abnormal state, the device identifier corresponding to the smart home device based on the state information of the smart home device;

checking, in response to the state information of the smart home device indicating that the smart home device is in the abnormal state, other smart home devices in the same smart home scene to determine whether another smart home device in the same smart home scene is linked to the smart home device in the abnormal state, wherein the another smart home device in the same smart home scene being linked to the smart home device indicates that the another smart home device is dependent on the smart home device in the same smart home scene, and when the smart home device is deleted or offline, the another smart home device will not be triggered by the smart home device to operate; and marking, for the same smart home scene in the smart home scene list page in response to a presence of the another smart home device in the same smart home scene linked to the smart home device in the abnormal state, the device identifier corresponding to the another smart home device using a linkage failure identifier indicating that the another smart home device in the same smart home scene fails due to being linked to the smart home device in the abnormal state.

10. The intelligent terminal according to claim 9, wherein the processor, when executing the computer program, implements at least one of:

in response to the state information of the smart home device indicating that the smart home device is in the abnormal state, marking the device identifier corresponding to the smart home device with an icon based on the state information of the smart home device, and marking the device identifier corresponding to the smart home device with a text based on the state information of the smart home device.

11. The intelligent terminal according to claim 9, wherein the information on whether the smart home device is abnormal comprises information on whether the smart home device is deleted and information on whether the smart home device is offline.

12. The intelligent terminal according to claim 9, wherein the device identifier corresponding to the smart home device in the abnormal state is marked using a failure identifier different from the linkage failure identifier, the failure identifier being a predetermined deletion identifier or a predetermined offline identifier, the predetermined deletion identifier being different from the predetermined offline identifier.

13. The intelligent terminal according to claim 9, wherein the processor, when executing the computer program, further implements:
generating, in response to the state information of the smart home device indicating that the smart home device is in the abnormal state, prompt information based on the state information of the smart home device, the prompt information comprising an entry for smart home scene re-editing.

14. The intelligent terminal according to claim 9, wherein the processor, when executing the computer program, implements:
obtaining, in response to detecting an access instruction for accessing the smart home scene list page, the state information of the smart home device corresponding to the device identifier displayed in the smart home scene list page.

15. The intelligent terminal according to claim 9, wherein in response to detecting that at least one of a location of the intelligent terminal and current time satisfies a scene execution trigger condition for one smart home scene in the smart home scene list page, the state information of the smart home device corresponding to the device identifier displayed in the smart home scene list page is obtained.

16. The intelligent terminal according to claim 15, wherein the processor, when executing the computer program, further implements:
in response to detecting a manual execution instruction, controlling each smart home device in a corresponding smart home scene based on the manual execution instruction, and feeding back an execution result using a first feedback scheme; and
in response to detecting an automatic execution instruction issued by the intelligent terminal, controlling each smart home device in a corresponding smart home scene based on the automatic execution instruction, and feeding back an execution result using a second feedback scheme different from the first feedback scheme.

17. A non-transitory computer-readable storage medium, having a computer program stored thereon, wherein the computer program, when executed by a processor, implements:
obtaining state information of a smart home device corresponding to a device identifier displayed in a smart home scene list page, the smart home scene list page being configured to list different smart home scenes and display, for each of the listed smart home scenes, device identifiers contained in the smart home scene, in each smart home scene a plurality of smart home devices being controlled in a combined manner to perform a user-specified task, and the state information comprising information on whether the smart home device is abnormal;
marking, in response to the state information of the smart home device indicating that the smart home device is in an abnormal state, the device identifier corresponding to the smart home device based on the state information of the smart home device;
checking, in response to the state information of the smart home device indicating that the smart home device is in the abnormal state, other smart home devices in the same smart home scene to determine whether another smart home device in the same smart home scene is linked to the smart home device in the abnormal state, wherein the another smart home device in the same smart home scene being linked to the smart home device indicates that the another smart home device is dependent on the smart home device in the same smart home scene, and when the smart home device is deleted or offline, the another smart home device will not be triggered by the smart home device to operate; and
marking, for the same smart home scene in the smart home scene list page in response to a presence of the another smart home device in the same smart home scene linked to the smart home device in the abnormal state, the device identifier corresponding to the another smart home device using a linkage failure identifier indicating that the another smart home device in the same smart home scene fails due to being linked to the smart home device in the abnormal state.

18. The non-transitory computer-readable storage medium according to claim 17, wherein the computer program, when executed by the processor, implements at least one of:
in response to the state information of the smart home device indicating that the smart home device is in the abnormal state, marking the device identifier corresponding to the smart home device with an icon based on the state information of the smart home device, and marking the device identifier corresponding to the smart home device with a text based on the state information of the smart home device.

19. The non-transitory computer-readable storage medium according to claim 17, wherein the computer program, when executed by the processor, further implements:
generating, in response to the state information of the smart home device indicating that the smart home device is in the abnormal state, prompt information based on the state information of the smart home device, the prompt information comprising an entry for smart home scene re-editing.

20. The non-transitory computer-readable storage medium according to claim 17, wherein the computer program, when executed by the processor, implements:
obtaining, in response to detecting an access instruction for accessing the smart home scene list page, the state information of the smart home device corresponding to the device identifier displayed in the smart home scene list page.

* * * * *